US011663700B2

(12) United States Patent
Swanson et al.

(10) Patent No.: US 11,663,700 B2
(45) Date of Patent: May 30, 2023

(54) AUTOMATIC ELIMINATION OF NOISE FOR BIG DATA ANALYTICS

(71) Applicant: Intel Corporation, Santa Clara, CA (US)

(72) Inventors: John A. Swanson, Forest Grove, OR (US); Vivek K. Singh, Portland, OR (US); Kumara Sastry, Hillsboro, OR (US); Helen F. Parks, Hillsboro, OR (US); I-Tzu Chen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 963 days.

(21) Appl. No.: 16/457,926

(22) Filed: Jun. 29, 2019

(65) Prior Publication Data
US 2019/0325321 A1 Oct. 24, 2019

(51) Int. Cl.
G06N 3/126 (2023.01)
G06N 20/00 (2019.01)
G06N 7/01 (2023.01)
G06T 5/00 (2006.01)
G06F 17/18 (2006.01)
G06F 18/24 (2023.01)
G06V 10/762 (2022.01)
G06V 10/764 (2022.01)
G06V 10/40 (2022.01)

(52) U.S. Cl.
CPC .............. *G06T 5/002* (2013.01); *G06F 17/18* (2013.01); *G06F 18/24* (2023.01); *G06N 3/126* (2013.01); *G06N 7/01* (2023.01); *G06N 20/00* (2019.01); *G06V 10/40* (2022.01); *G06V 10/762* (2022.01); *G06V 10/764* (2022.01)

(58) Field of Classification Search
CPC ........ G06N 3/126; G06N 7/005; G06N 20/00; G06N 5/025; G06N 20/20; G06F 17/18; G06F 30/392; G06F 16/215; G06K 9/6267; G06K 9/6284; G06K 9/6218; G06V 2201/06; G06V 10/40; G06V 10/762; G06V 10/764; G06T 2207/10061; G06T 2207/30148; G06T 5/002
See application file for complete search history.

(56) References Cited

U.S. PATENT DOCUMENTS

2019/0188212 A1* 6/2019 Miller .................... G06N 7/005

OTHER PUBLICATIONS

Janek Thomas, "Gradient Boosting in Automatic Machine Learning: Feature Selection and Hyperparameter Optimization", Feb. 21, 2019 (Year: 2019).*

(Continued)

*Primary Examiner* — Viker A Lamardo
(74) *Attorney, Agent, or Firm* — Alliance IP, LLC

(57) ABSTRACT

A method comprising identifying a set of target features for a plurality of data instances of an input data collection; determining feature values for the set of target features for the plurality of data instances; identifying a plurality of outlier data instances based on the determined feature values; identifying a plurality of noisy data instances from the outlier data instances based on feature values of the plurality of noisy data instances, wherein a noisy data instance is identified based on a determination that noise is present in noisy data instance; and providing an indication of the plurality of noisy data instances.

20 Claims, 7 Drawing Sheets

(56) References Cited

OTHER PUBLICATIONS

Bischl, B. et al. "mlrMBO: A Modular Framework for Model-Based Optimization of Expensive Black-Box Functions." arXiv: Machine Learning (2017): n. pag. (Year: 2017).*

Xiaohui Liu, Gongxian Cheng and J. X. Wu, "Analyzing outliers cautiously," in IEEE Transactions on Knowledge and Data Engineering, vol. 14, No. 2, pp. 432-437, Mar.-Apr. 2002, doi: 10.1109/69.991726. (Year: 2002).*

M. Saqlain, B. Jargalsaikhan and J. Y. Lee, "A Voting Ensemble Classifier for Wafer Map Defect Patterns Identification in Semiconductor Manufacturing," in IEEE Transactions on Semiconductor Manufacturing, vol. 32, No. 2, pp. 171-182, May 2019, doi: 10.1109/TSM.2019.2904306. (Year: 2019).*

H. Wang and Y. Jin, "A Random Forest-Assisted Evolutionary Algorithm for Data-Driven Constrained Multiobjective Combinatorial Optimization of Trauma Systems," in IEEE Transactions on Cybernetics, vol. 50, No. 2, pp. 536-549, Feb. 2020, doi: 10.1109/TCYB.2018.2869674. (Year: 2018).*

Kim, Jinwoo, "Hierarchical asynchronous genetic algorithms for parallel/distributed simulation-based optimization.", Dissertation-Reproduction (electronic), 1994 (Year: 1994).*

Cheng, Gongxian, et al.; "Analyzing Outliers Cautiously;" IEEE Transactions on Knowledge and Data Engineering, vol. 14, No. 2, Mar./Apr. 2002, 6 pages.

Cheng, Huiyuan, et al.; "Outlier Distribution Detection Approach to Semiconductor Wafer Fabrication Process Monitoring," IEEE, 3rd Asia Symposium on Quality Electronic Design; Jul. 2011; 6 pages.

EPO; Extended European Search Report issued in EP Patent Application No. 20163803.8, dated Sep. 2, 2020; 10 pages.

EPO Communication Pursuant to Article 94(3) EPC in EP Application Serial No. 20163803.8-1207 dated Oct. 27, 2022 (8 pages).

\* cited by examiner

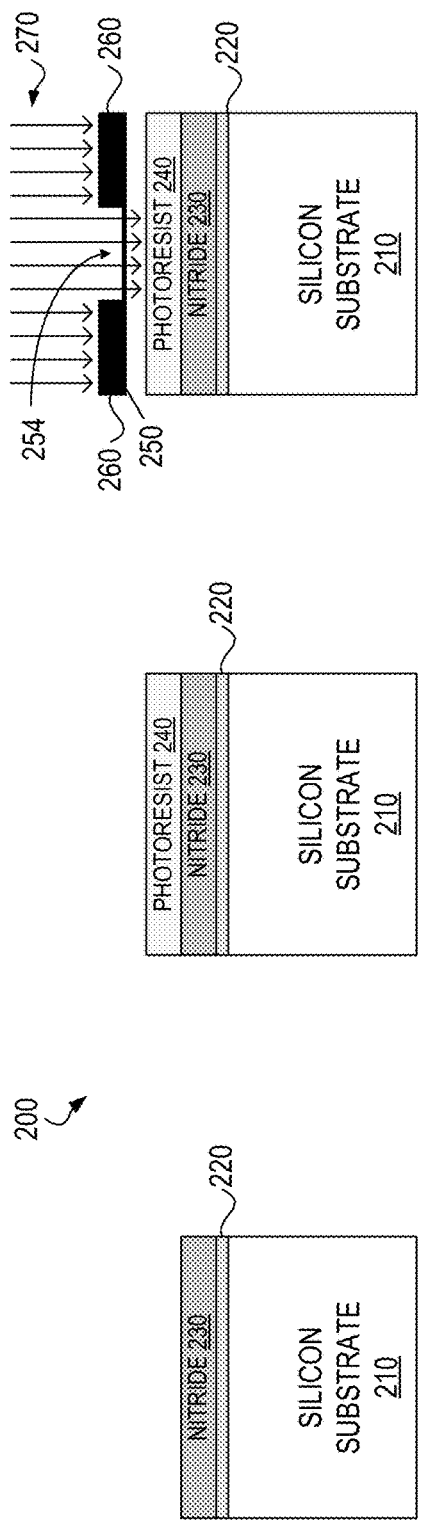

AUTOMATIC ELIMINATION OF NOISE FOR BIG DATA ANALYTICS

TECHNICAL FIELD

This disclosure relates in general to the field of computing systems and, more particularly, to automatic elimination of noise for big data analytics.

BACKGROUND

Cutting-edge semiconductor manufacturing processes are terribly complex. Housed in billion-dollar factories and comprising hundreds of processing steps to yield a finished device, they are capable of reliably printing features as small as 10 nm hundreds of billions of times across wafers that extend a foot in diameter. Developing a new semiconductor manufacturing process requires defining a set of design rules that establish constraints that a semiconductor device must follow to ensure manufacturability. Process development also involves developing optical proximity correction (OPC) recipes that adjust physical design features before they are printed on a mask to help counter feature distortions caused by various processing steps.

Scanning electronic microscopy (SEM) or other images taken during wafer manufacturing can help identify physical design patterns and geometries that may explain manufacturing defects. These patterns and geometries can be used to help define the design rules and OPC recipes for a process. The manufacture of a single wafer can generate a large amount of image data given the large wafer size and number of processing steps in modern processes. As a process matures, manufacturing defects occur less frequently, making them hard to find in a vast sea of image data.

BRIEF DESCRIPTION OF THE DRAWINGS

FIGS. 2A-2F illustrate an exemplary photolithography process in accordance with certain embodiments.

Like reference numbers and designations in the various drawings indicate like elements.

DESCRIPTION OF EXAMPLE EMBODIMENTS

Figure 1A:
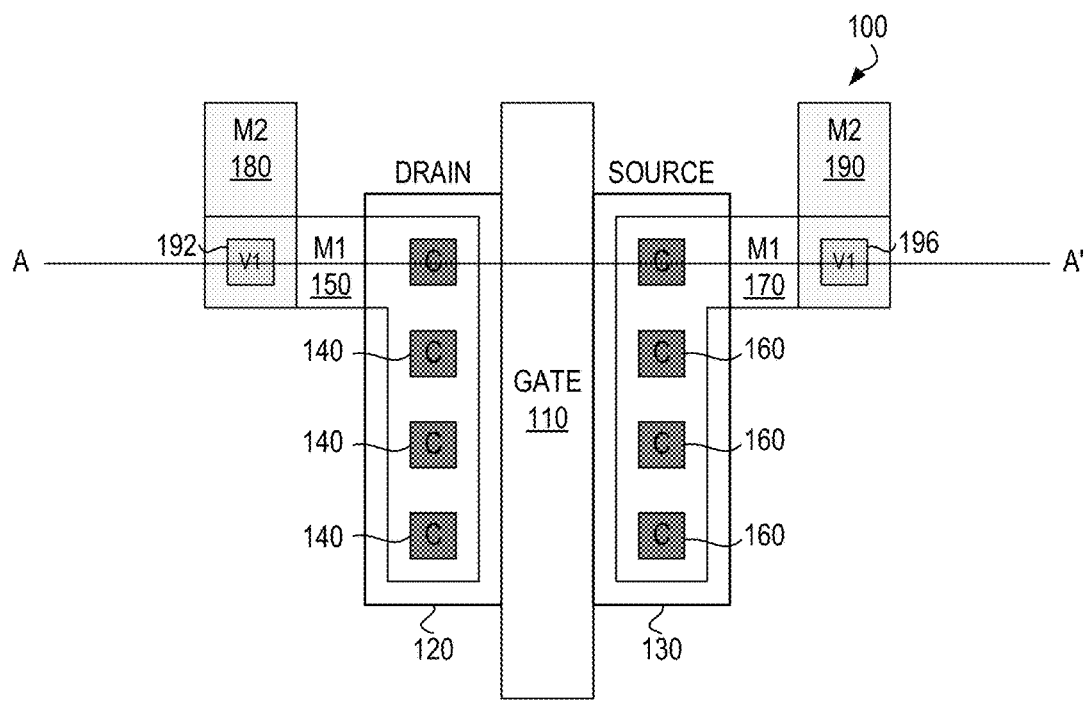
FIG. 1A illustrates the physical design of an exemplary planar transistor in accordance with certain embodiments.

Semiconductor manufacturing has become increasingly complex over the years. Since the turn of the century, the minimum feature size has shrunk by over an order of magnitude as the industry has progressed from the 130 nanometer (nm) to 10 nm technology nodes. At the same time, processor complexity has dramatically increased. Current flagship products have transistor counts that well exceed 10 billion. To handle these reduced feature sizes and increased chip complexities, companies must invest billions of dollars and years of research to build state-of-the-art fabrication facilities. Research and development costs are driven ever-upward by the rising cost of increasingly sophisticated equipment needed for advanced processes. The industry has taken steps to decrease per-transistor manufacturing costs (for example, by moving from 200 mm to 300 mm wafers at the 90 nm technology node), but the overall trend has been for each process generation to cost more than the last. With up to hundreds of individual dies on wafers that span a foot in diameter, the total number of transistors that can be printed on a wafer is on the order of one trillion. Developing high-volume manufacturing processes that can reliably manufacture transistors at such an extreme scale presents considerable challenges.

One such challenge is discovering the patterns and geometries in a physical design responsible for limiting process yield. Manufacturing defects can be discovered through analysis of images generated by an imaging tool during wafer manufacturing, but the amount of image data that is to be analyzed to locate defects can be tremendous (up to millions of images). As a process matures, the presence of a manufacturing defect in the mountain of image data that can be generated may be a rare event. Once defects are located, determining whether a particular physical design pattern or geometry is responsible for a class of defects is another difficult task, particularly considering the amount of data that to be analyzed.

The technologies described herein extract semantic patterns from large amounts of silicon data to aid in semiconductor manufacturing process development. Large numbers of images are analyzed for the presence of manufacturing defects in areas of interest on a wafer. A continuous itemset is generated with items containing the values of physical design features corresponding to the areas of interest and an event value indicating the presence or absence of a manufacturing defect at that location. Entropy-based discretization is performed on the discretized itemset to generate a set of candidate semantic patterns. As used herein, the phrase "semantic pattern" refers to one or more sentences or phrases describing constraints on one or more physical design feature values. A semantic pattern can describe a single value for a feature, "gate length=20 nm," a range of values for a feature, "gate endcap space 18 nm," and constraints for multiple features, "gate length=20 nm, gate endcap space 18 nm."

The set of candidate semantic features is reduced to a set of final semantic features that are ranked and presented to a user, such as a process engineer. The semantic features can be ranked based on their accuracy, coverage, interpretability, and independence. Generally, top-ranked semantic patterns are generally those that do a good job of explaining manufacturing defects (the patterns are accurate and provide good defect coverage, as will be discussed in greater detail below) and are simple for a user to understand. The user can use extracted semantic patterns to improve a process by updating the design rule set for a process, improving an optical proximity correction (OPC) recipe, or in other manners.

Reference is now made to the drawings, wherein similar or same numbers may be used to designate same or similar parts in different figures. The use of similar or same numbers in different figures does not mean all figures including similar or same numbers constitute a single or same embodiment.

Turning now to FIGS. 1-3, an overview of various aspects of semiconductor device manufacturing is presented. FIG. 1A illustrates the physical design of an exemplary planar transistor. As will be discussed in greater detail below, the physical design of a transistor is used to generate the masks that will be used during manufacturing to print the features on a wafer needed to implement a particular design. The physical design is typically a set of polygons drawn at various layers, such as a gate layer, contact layer, and metal-1 layer.

Transistor 100 is a field-effect-transistor (FET), the transistor type that comprises the bulk of transistors used in modern semiconductor devices. Transistor 100 comprises gate 110, drain 120, and source 130 regions. The gate region in a FET can be thought of as an "on-off" switch that controls the flow of current between drain and source regions. When gate 110 is "off", there is no (or little) current flowing through a channel region that connects drain 120 to source 130 and when gate 110 is "on", current readily flows through the channel region. Transistor 100 is connected to other transistors by a set of interconnect layers stacked vertically on top of transistor 100. Contacts 140 connect drain 120 to segment 150 of a first metal layer (M1), and contacts 160 connect source 130 to M1 segment 170. M1 segments 150 and 170 are in turn connected to a second metal layer (M2) segments 180 and 190 by a first layer of "vias" (V1) 192 and 196, respectively. In general, metal layer thickness increases as one moves up the interconnect stack, with thinner lower-level metals being generally used for the local routing of signals and thicker upper-level metals being used for global signal routing and power/ground planes. For simplicity, FIG. 1A shows only two levels of metal. Current semiconductor manufacturing processing have up to ten layers of metal interconnects.

Figure 1B:
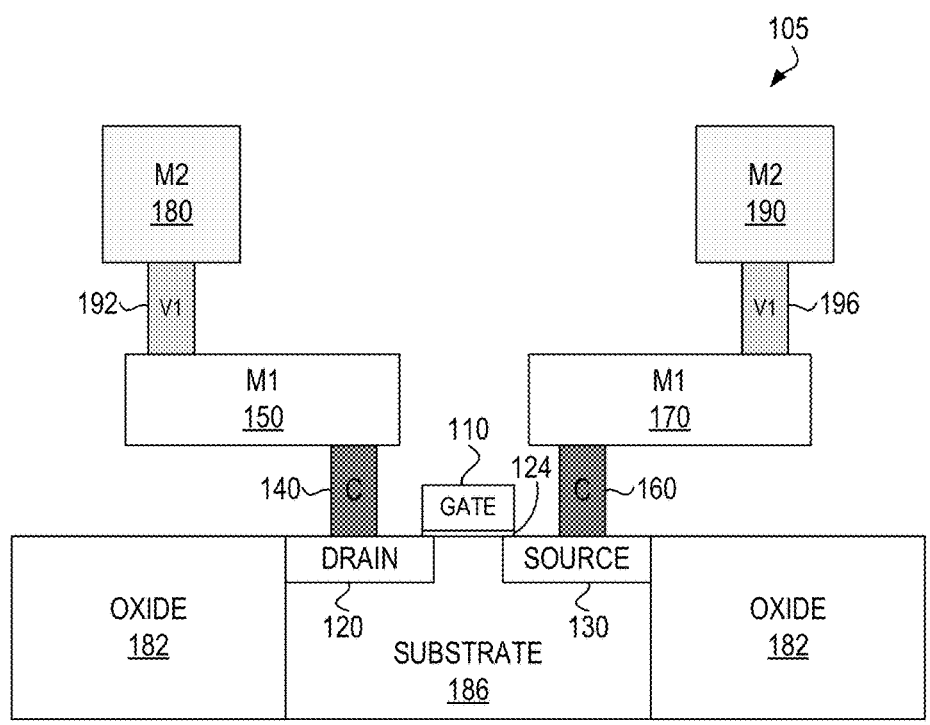
FIG. 1B illustrates an exemplary cross-section of the planar transistor of FIG. 1A taken along the line A-A' in accordance with certain embodiments.

FIG. 1B illustrates an exemplary cross-section of the planar transistor of FIG. 1A taken along the line A-A'. Cross-section 105 shows gate 110 separated from drain 120 and source 130 regions by high-k dielectric layer 124, which electrically insulates gate 110 from drain 120 and source 130. Transistor 100 is in substrate region 186 and is insulated from adjacent transistors by oxide regions 182. The planar transistor illustrated in FIGS. 1A and 1B is just one type of transistor topography, the planar nature of the transistor reflecting that the gate, source, and drain regions are located on or are adjacent to a relatively planar surface. Another type of transistor topography is the non-planar transistor topography used in FinFETS, which are used extensively in cutting-edge manufacturing processes. Fin-FETS are field-effect transistors that operate under the same general principle as planar FET transistors—a gate controls the flow of current between drain and source region—with the variation that the gate wraps around a set of fins that extend vertically upwards from the wafer surface.

Essential to semiconductor manufacturing is the process of photolithography, by which patterns are transferred from a mask onto a wafer. As previously mentioned, masks are used to define the shape and location of various features to be patterned on a wafer for a given process layer. For example, one mask defines where oxide regions are located, another mask defines where high-k dielectrics will be located, another mask defines location of source and drain regions, and yet another mask will define where contacts will be placed. Additional masks may be used to define each metal layer and intervening via layers.

FIGS. 2A-2F illustrate an exemplary photolithography process. Process 200 illustrates how the oxide regions 182 in FIG. 1B can be defined using photolithography. In FIG. 2A, a thin silicon dioxide layer 220 is thermally grown across the top of silicon substrate 210 of a wafer. Silicon nitride layer 230, a protective layer, is deposited on top of silicon dioxide layer 220. In FIG. 2B, photoresist 240 is deposited on top of nitride layer 230. A photoresist is a material whose reactance to an etchant or solvent increases (if a positive photoresist) or decreases (negative photoresist) upon exposure to light. In process 200, photoresist 240 is a positive photoresist. In FIG. 2C, mask 250 with patterns 260 is positioned over the wafer and exposed to light. The light passes through transparent region 254 of mask 250 and exposes photoresist 240. Patterned regions 260 are opaque to the light and the photoresist regions under patterns 260 are not exposed. In FIG. 2D, photoresist 240 is chemically developed and the exposed regions are dissolved. The remaining portions of photoresist 240 can now act as an on-wafer mask to allow for selective processing of the wafer. In FIG. 2E, the wafer is subjected to an etch step that removes a portion of the silicon nitride layer 230, silicon dioxide layer 220, and substrate 210 to create trench 270. In FIG. 2F, the photoresist and nitride layers are removed, and trench 270 is filled with silicon dioxide to create shallow trench isolation (STI) region 280 that serve to keep transistors formed in regions 294 and 298 electrically isolated from each other.

As masks are the means by which features are realized in semiconductor devices, any semiconductor device design must ultimately be reduced to a physical design, the level of design abstraction from which masks are be generated. The physical design of a transistor (such as FIG. 1A), circuit, or processor to be manufactured is often referred to as a "layout." Electronic design automation (EDA) tools allow processor architects and circuit designers to design at levels of abstraction above the physical design level. They are thus spared from having to spend their days drawing polygons in layout tools to realize their designs. Architects typically define their designs using a hardware design language (HDL), such as VHDL or Verilog. Once they have verified that their designs perform as desired, a physical design can be generated automatically using a library of standard layout cells. Circuit designers often seek performance or functionality not available using standard cells and often enter their designs into a schematic capture tool. Once their custom designs are finalized, the circuit schematics are handed off to layout designers who manually craft the custom physical designs.

Regardless of whether a physical design is generated automatically or manually it must conform to a set layout design rules established for a manufacturing process. Design rules are constraints that a physical design must follow to ensure manufacturability. Most design rules express a minimum width or space for a feature, such as, "gate length 10 nm," "source/drain diffusion enclosure of a contact 16 nm," and "space between metal-1 traces 20 nm." Design rules represent a trade-off between feature density and manufacturability. Being able to print smaller feature sizes can mean more die can be packed onto a wafer but if the process cannot reliably print the smaller features, the resulting reduction in wafer yield can more than offset cost reduction gained by being able to print more die on a wafer.

Developing design rules for a new process can be difficult as unexpected difficulties can arise. For example, a feature may not scale as much as expected from the previous technology generation due to unforeseen difficulties with a new processing step or a new tool. As process engineers develop a new manufacturing process, they continually fine-tune the individual processing steps to remove as many defect sources as possible. At some point, the process has been tuned enough that the remaining defects that need to be rooted out occur so infrequently that they are difficult to find. Process engineers need to find the occurrence of these rare events during process development so that they can determine whether a tweak to the process can be figured out to reduce the occurrence of the rare event, or to add a design rule to the design rule set so that physical design geometries and patterns correlated to a specific defect are kept out of the final physical design.

Once a physical design is clear of design rule violations and has passed other design validation checks, it is passed to the mask generation phase of an EDA flow. The mask generation phase is far from trivial due to the large discrepancy between the wavelength of the light ($\lambda$=193 nm) that has been used since the 90 nm technology node and the minimum feature sizes (10 nm) used in the current processes. The minimum feature size that can be printed clearly in a photolithographic process is limited by the wavelength of the light source used and the semiconductor industry has developed resolution enhancement technologies (RET) to allow for the printing of features well below the 193 nm light source wavelength. A first set of RET techniques works to increase resolution and/or depth of focus, and a second set compensates for distortion effect due to printing features with a wavelength larger than minimum feature sizes as well as those inherent in deposition, etching, and other process steps. The first set includes techniques such as phase-shift masks and double-patterning, and the second set includes optical proximity correction (OPC).

Figure 3A:
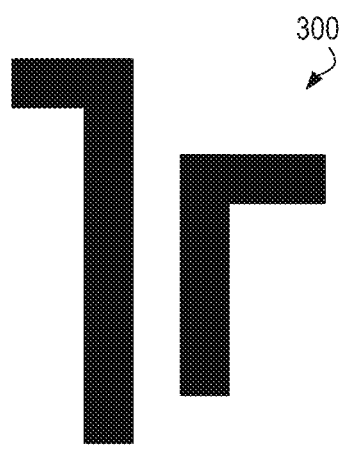
FIGS. 3A-3D illustrate differences between features printed on a mask and those processed on a wafer due to process distortion effects and the use of optical proximity correction to counter those effects in accordance with certain embodiments.
Figure 3B:
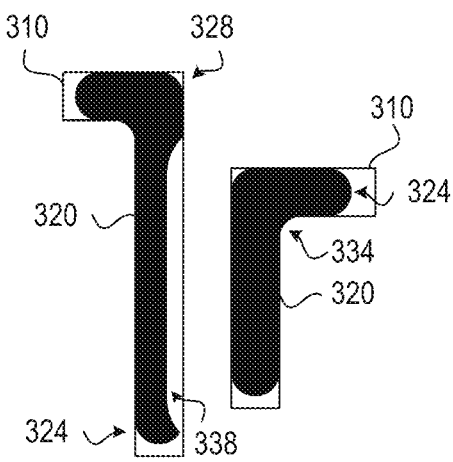
Figure 3C:
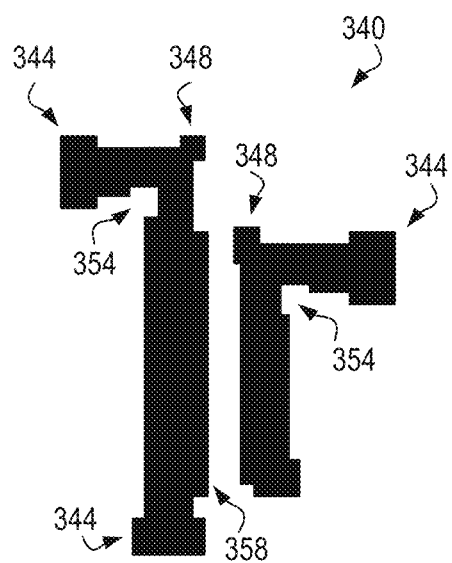
Figure 3D:
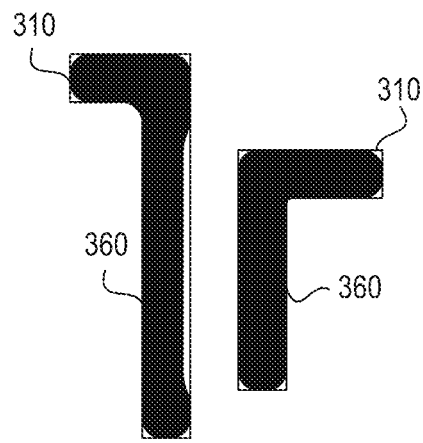

FIGS. 3A-3D illustrate differences between features printed on a mask and those processed on a wafer due to process distortion effects and the use of optical proximity correction to counter those effects. FIG. 3A illustrates two gate polygons 300 in a physical design before being subjected to an OPC process. FIG. 3B illustrates a simplified view of how polygons 300 may appear as processed on a wafer. Outlines 310 represent the boundaries of polygons 300 and shapes 320 represent the corresponding as-processed features. It can be seen that ends 324 and exterior corners 328 of shapes 320 are rounded off, interior corners 334 are filled in, and segment 338 narrowed due to a nearby feature. FIG. 3C illustrates exemplary modified polygons 340 generated by subjecting polygons 300 to an OPC process. Modified polygons 340 are much more complex than original polygons 300. Modified polygons 340 include "dog-bone" features 344 that compensate for end-rounding, "ear" features 348 that compensate for exterior corner-rounding, "mouse-bite" features 354 that compensate for interior corner-rounding, and thickening features 358 that compensate for the presence of nearby features. FIG. 3D illustrates a simplified view of how modified polygons 340 may appear on a wafer after processing. Outlines 310 again represent the boundaries of original polygons 300. As can be seen, modification of polygons 300 by the OPC process results in printed shapes 360 that are closer to the shape and size of original polygons 300. The ends and corners of shapes 360 are less rounded off, the interior corners are less filled in, and the impact of nearby neighbors is diminished.

While OPC generation (and other RET techniques) have allowed minimal features to scale with technology node as the wavelength of the photolithographic light source has remained constant, it does not come without its costs. OPC generation is computationally intensive. OPC recipes can be based on physical models of various processing steps (photolithography, diffusion, etch, deposition, etc.), or be rule-based models that generate OPC features based on individual physical design feature characteristics (width, length, shape, nearest-neighbor characteristics) without relying on the physics of the underlying process steps. The application of model-based OPC recipes to a complete physical design may involve the application of physical models to over 10 billion shapes at the gate layer alone and to billions of additional shapes on other layers. Further, the generation of rule-based OPC models, which may save some of the computational complexity of model-based OPC generation, can be a complex affair. Generation of rule-based OPC recipes can be based on trial-and-error due to a lack of full understanding of the complex physics and chemistries at play in the development of cutting-edge processing technologies. This trial-and-error can comprise iteratively manufacturing features with many variations of candidate OPC recipes and seeing which recipes produce the best results.

Figure 4:
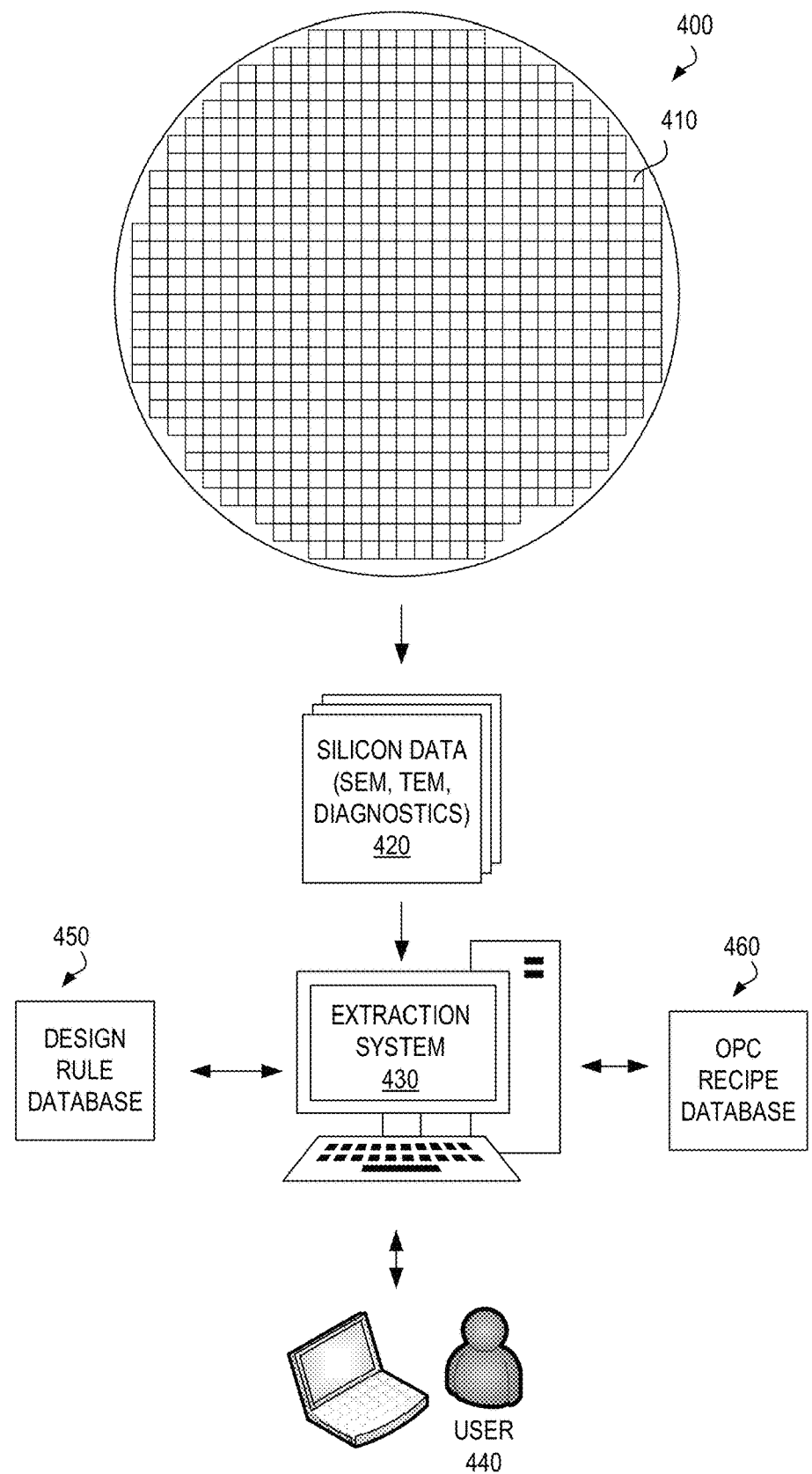
FIG. 4 illustrates an embodiment of silicon data capture and utilization of silicon data to aid semiconductor manufacturing process development in accordance with certain embodiments.

FIG. 4 illustrates an embodiment of silicon data capture and utilization of silicon data to aid semiconductor manufacturing process development. Silicon wafer 400 comprises dies 410. As discussed earlier, current technology nodes employ 300 mm wafers, which can comprise hundreds of dies. The dies are separated by scribe lines that can contain test structures that can be used to monitor the health of manufacturing process and that are consumed by the dicing process, where a wafer is cut into individual dies 410. During the manufacture of silicon wafer 400, silicon data 420 can be generated that can be used for the development of a new process or to monitor the health of a mature one. Silicon data 420 can be any data collected during the manufacturing of wafer 400, such as diagnostic data or images captured by an imaging tool such as a such as a scanning electron microscope (SEM), a transmission electron microscope (TEM), a scanning transmission electron microscope (STEM), or a focus ion beam microscope (FIB). Diagnostic data can include data collected from the scribe line test structures, which can measure electrical properties of varies features or layers (e.g., contact or via resistance, metal layer sheet resistance), or indicate the presence of manufacturing defects by testing for shorts between, for example, gate or metal structures that reflect minimum features or layout patterns of concern.

Any number of images can be generated per wafer. Images can be taken of one or more areas of interest on an individual die for various die on a wafer. For example, images may be taken of the gate layer in a region where the gate patterns are particularly dense (such as in a memory array) and for representative dies across the wafer to capture cross-wafer manufacturing variations. Images can be taken at any point in the manufacturing process. As images can capture a field of view that is hundreds of microns in length and width, individual images can contain many instances of minimum features or areas of interest.

Silicon data 420 can be generated for wafers processed during process development or monitoring and can be generated for wafers processed across fabrication facilities to evaluate cross-facility manufacturing robustness. Given today's large wafer sizes, process complexities, and wafer run rates, the amount of silicon data that can produced during process development or monitoring can be tremendous. The number of images generated during process development alone can reach into the millions.

Silicon data 420 can be supplied to a semantic pattern extraction system 430 that digests copious amounts of silicon data and presents to a process engineer or other user 440 information that may useful in developing a new process or improving an existing one. In some examples, the information provided can be semantic patterns (phrases or sentences that are easily understandable by a human) that suggest which physical design patterns or geometries may be responsible for a defect. In other examples, system 430 can utilize the silicon data 420 to determine one or more design rules that may improve process yield and update design rule database 450 for a process or update an OPC recipe database 460 by updating an existing OPC recipe or creating a new one that may improve yield.

Because the silicon data 420 may be very large (e.g., petabytes), processing and analysis of such data may be extremely time consuming. The presence of noise in the data may further complicate the analysis of the silicon data 420. Noise may be introduced, e.g., into images taken by an imaging tool due to various reasons, such as faulty image sensors, suboptimal lighting conditions, or corrupted data. The ability to detect and eliminate data with noise from big data analytics improves the ability to accurately process the data. Existing noise filtering methods for image data either can't process large data sets in a reasonable amount of time, depend heavily on already known types of noise, or are prone to misclassification. Eliminating noise accurately from the data set may enable a more efficient focus on true outlier data, which may be the actual data of interest. For example, in the context of semiconductors, the outlier data may represent a defect due to a process issue.

Various embodiments of the present specification may automatically, accurately, and/or routinely detect and eliminate noisy data from large data sets. Particular embodiments may promote semiconductor yield improvements by providing a focus on true outliers rather than noisy data. In one embodiment, a multi-step artificial intelligence (AI) method accurately detects and eliminates noise from an extremely large data set (e.g., comprising petabytes of data). In a particular embodiment, the method may eliminate noisy images from SEM data (or other image data) used to track semiconductor yield and process health, though the teachings described herein may be used to eliminate noisy samples from any suitable data set, such as data captured using any suitable sensor or other suitable data.

Figure 5:
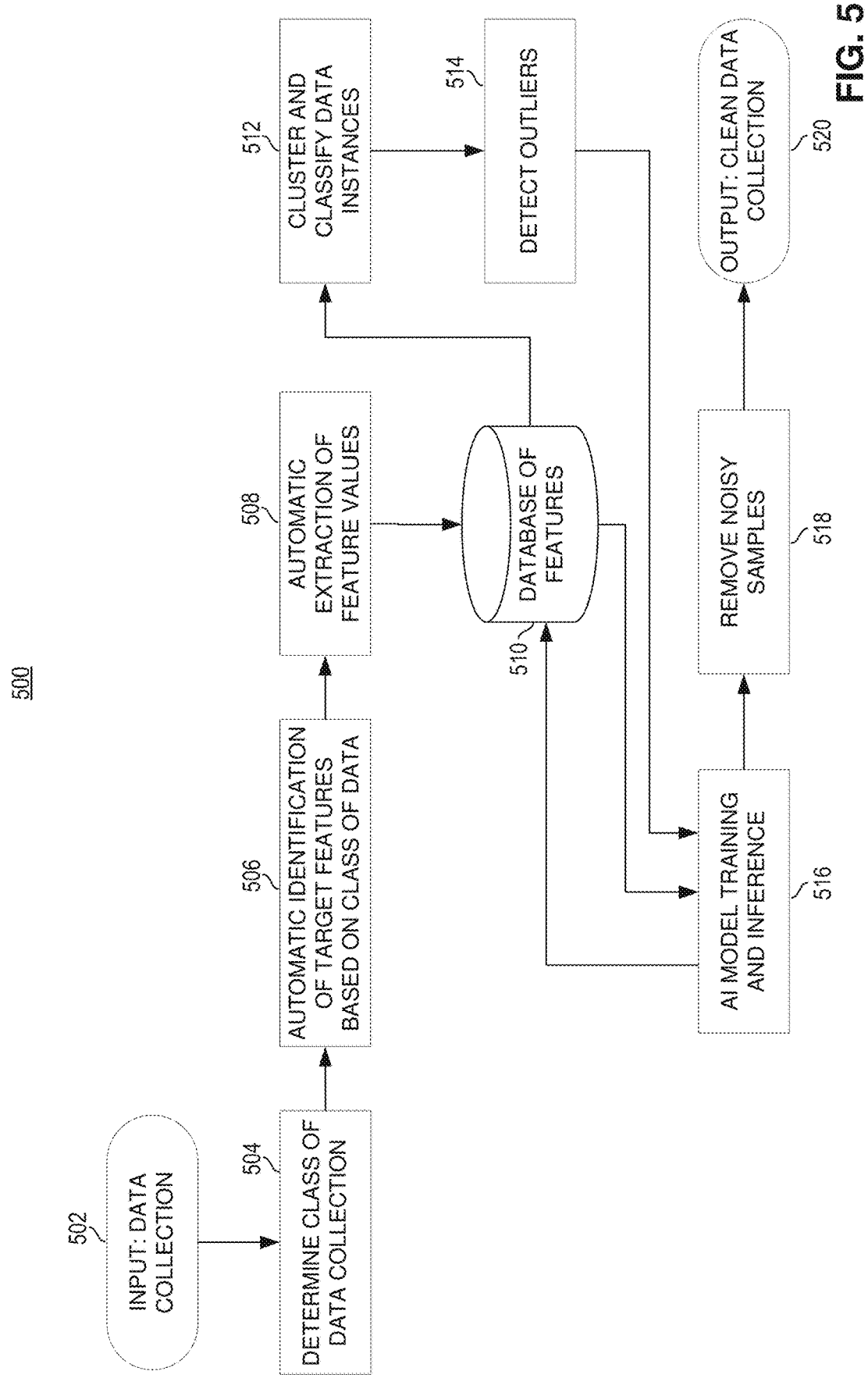
FIG. 5 illustrates a flow for removing noise from an input data collection in accordance with certain embodiments.

FIG. 5 depicts a flow 500 for removing noisy samples from an input data collection 502 in accordance with certain embodiments. In a particular embodiment, each block of flow 500 may represent a module of a computing system that is operable to perform the functions described with respect to the block. In a particular embodiment, flow 500 (or any suitable portion thereof) may be performed by extraction system 430, computing system 700 (described in detail below), other suitable computing system, or other suitable logic.

Data collection 502 may comprise a plurality of discrete data instances. In a particular embodiment, each data instance is a data sample collected using any suitable sensor, such as an imaging tool such as that described above (e.g., an SEM), other image sensor, an audio sensor, a heartrate monitor, or other suitable sensor. In various embodiments, data collection 502 is a subset of silicon data 420 or my have any suitable characteristics of silicon data 420 described herein. In another embodiment, each data instance is a snapshot of a layout database file. A layout database file may provide a representation of a semiconductor chip in terms of planar geometric shapes (e.g., polygons) corresponding to patterns of, e.g., metal, oxide, or semiconductor layers of the chip. A layout database file may represent the physical placement of various devices on the chip. Such a file may specify the presence or absence of various features on different mask layers for masks used to produce the chip. Thus, in a particular embodiment, each data instance of data collection 502 may encompass a particular portion of a layout database file that corresponds to a particular geographical area of one or more layers of the chip. Any suitable database file format may be used for the layout, such as Graphic Data System II (GDS II), Open Artwork System Interchange Standard (OASIS), or other suitable format.

Data collection 502 may comprise or be a portion of a large collection (e.g., gigabytes or terabytes, or petabytes) of multivariate data. In a particular embodiment, data collection 502 comprises a large set of images captured from one or more dies of one or more semiconductor wafers for a particular process step (e.g., the set of images may be taken at a particular processing layer, such as any of the processing layers described above or other suitable processing layer). Over time, the flow 500 may receive various different data collections that may be related (e.g., sets of images of chips of wafers at various different processing layers) or disparate (e.g., other sets of images of chips of wafers of different process technologies). In another embodiment, data collection 502 may comprise various snapshots of a layout database file for one or more processing layers. In yet another embodiment, data collection 502 may comprise images captured by an image sensor of an autonomous vehicle.

At 504, a class of the data collection 502 is determined. A class comprises an identification of one or more common characteristics of the data instances in the data collection 502. As one example, when data collection 502 comprises images of a semiconductor wafer, a class may indicate a technology node (also commonly referred to as process node or process technology) that refers to a specific semiconductor manufacturing process as well as a particular processing layer (e.g., gate layer, contact layer, metal-1 layer or other suitable layers including, e.g., any of the layers described herein) at which the images of the data collection 502 were taken. In one embodiment, the class may additionally or alternatively identify the sensor (e.g., imaging tool) used to capture the data instances. As another example, when data collection 502 comprises images captured by an autonomous vehicle, the class may specify an environment (e.g., road type, weather condition, etc.) in which the images were captured.

In some embodiments, the data collection 502 that is received by a computing system implementing the flow may be tagged with the class. Accordingly, the determination of the class of the data collection 502 may be as straightforward as identifying the tag in the incoming data. In other embodiments, the class of the data collection 502 may be determined through analysis of the data collection. For example, a small subset of the data instances of the data collection 502 may be analyzed to determine feature values of various features of the data instances.

Any suitable features may be analyzed at 504 to determine the class of the data. In some embodiment, the features comprise image properties. Features may include, e.g., any combination of one or more of a measure of local variance of intensities, a local intensity maximum, a local intensity minimum, a local or global image intensity histogram, local or global image contrast variation, line-edge roughness, line-width roughness, an indication of salt and pepper noise (which may be based on metrics of greyness, whiteness, and/or darkness in the image), varying levels of greyness, detected splotches (e.g., unexpected clusters of white or grey pixels in images or other unexpected clusters of pixels of certain intensity) which in some embodiments may be a Laplacian of a Gaussian-based blob measure, image entropy, merged contours of features, broken contours of features, unexpected contours, contour width distribution, contour height distribution, contour area distribution, alignment quality (e.g., a measure of how well various points or contours of an actual image are aligned with respect to the expected geometries as defined by the database layout file), or alignment distance (e.g., a difference between an intended location of the image and the actual location of the image when an entire image is shifted relative to the intended location).

In some embodiments, at 504, feature values for features of a set of features may be determined for a subset of the data instances of the data collection 502. These feature values may be analyzed to determine a class of the data collection 502. For example, the class may be determined based on a comparison of the feature values or statistical metrics derived therefrom with feature values or statistics derived therefrom associated with various different types of classes. In various embodiments, the feature values or statistics derived therefrom that are associated with the various different types of classes may be based on historical data (e.g., previous data collections analyzed by the computing system or other data accessible by the computing system) or parameters specified by any suitable entity. The class that aligns most closely with the feature values determined for the subset of the data collection 502 may be selected as the class for the data collection 502.

In some embodiments, the received data collection 502 may be tagged with information partially identifying the class. For example, the data collection 502 may include an indication of a semiconductor processing layer at which an image was taken. The analysis of feature values may then be used in conjunction with the partial identification to determine the class for the data collection 502. In one example, the classes that do not match the partial identification may be excluded from the selection of the class based on the feature values obtained for the subset of data instances of data collection 502.

At 506, target features are automatically identified based on the class of the data. The target features may be the features that are deemed useful for identifying data instances that are outliers relative to other data instances and/or for facilitating distinctions between noisy data instances and other data instances that are legitimate outliers. The target features may be any suitable features, such as one or more of the features described above or other suitable features.

In a particular embodiment, the target features are a subset of the list of features for which feature values were determined for the subset of samples at 504. In other embodiments, the target features are not a subset of the features analyzed at 504 (e.g., the target feature set for the selected class may include one or more features that were not analyzed at 504), even though the target features may or may not include one or more features that were analyzed at 504.

In some embodiments, a plurality of classes are each associated with a respective set of target features. In some embodiment, the target feature sets for two or more classes may be identical. In other embodiments, the target features for each class may be unique. Any suitable combination of common and/or unique target feature sets are contemplated herein. In some embodiments, each of the target feature sets for the various classes is a subset of the list of features analyzed at 504.

At 508, features values for the target feature set associated with the selected class are extracted for each of the data instances of the data collection 502. For example, for a first data instance, a first feature value for a first feature of the target feature set, a second feature value for a second feature of the target feature set, and so on are determined for the first data instance. Similarly, feature values are determined for a second data instance, a third data instance, and so on. The feature values may have any suitable format and the format of the feature values may vary from feature to feature in some instances. As examples, a feature value may include one or more binary indications (e.g., of whether the feature is present in the data instance), a feature value may be one or more rational numbers, a feature value may be one or more indices that refer to one or more corresponding values, or a feature value may have any other suitable format.

The extracted feature values are stored in database 510. Database 510 may store these extracted feature values using any suitable format. In various embodiments, a record corresponding to a data instance may include or be associated with any one or more of an identifier of the data instance, the class of the data collection 502 that includes the data instance, an identification of a sensor (e.g., imaging tool) used to capture the sample value, the extracted feature values for the data instance, one or more clustering classes assigned to the sample value (to be described in more detail below), one or more confidence metrics associated with the one or more clustering classes (e.g., a confidence metric may represent a probability that the data instance belongs to the assigned clustering class), a tag indicating whether the data instance was detected as an outlier, and (e.g., if the data instance was detected as an outlier) whether the data instance was determined to be a noisy data instance (the determination of the values of these two tags will be discussed in more detail below).

At 512, the data instances are clustered based on their feature values and classified based on the clustering. For example, the data instances may be assigned to clustering classes based on their positions in a data space (where the position of a data instance is determined using a function that considers all of the feature values of the data instance). In other embodiments, the feature values may be individually clustered by feature. For example, the feature values of the various data instances for a first feature may be clustered to determine class groupings for the first feature. The feature values of the various data instances for a second feature may be separately clustered to determine class groupings for the second feature, and so on. Thus, a data instance could be assigned a class for each of the target features.

In some embodiments, one or more clustering classes may be assigned to a data instance, along with a confidence metric for each assigned clustering class. Any suitable clustering model may be used to partition the data instances into clusters and assign clustering classes. For example, a connectivity model (e.g., hierarchical clustering), centroid model (e.g., K-Means clustering), distribution model (e.g., expectation-maximization using multivariate normal distributions), or density model (e.g., DBSCAN or OPTICS) may be used. In some embodiments, multiple clustering models are used and multiple clustering classes may be assigned to a data instance (e.g., one or more clustering classes from each clustering model) or a single clustering class may be assigned to a data instance based on a fusion of the results of the multiple clustering classes.

In a particular embodiment, the clustering utilizes only the data instances of the data collection 502 (e.g., when historical values are not yet available or in other suitable situations). In various embodiments, the clustering utilizes both the data instances of the data collection 502 as well as historical data instances (e.g., data instances stored in database 510 that have the same class value as the data collection 502 and/or data instances that have a similar class to the class of the data collection 502, such as classes that are associated with the same feature set or other similar classes). In a particular embodiment, clustering results based on the historical values may be saved in the database 510 or other memory and utilized when a new data collection 502 is clustered and classified. In various embodiments, the clustering class(es) assigned to each data instance and any associated confidence metrics are recorded in the database 510.

After the sample values have been clustered and classified, data instances that are outliers are detected at 514. The outlier data instances may be detected in any suitable manner. For example, an outlier may be a data instance that was not able to be assigned a class at 512 (e.g., for a particular feature or for a combination of the features). As another example, an outlier may be a data instance that was assigned to a clustering class (e.g., for a particular feature or for a combination of the features) with a probability that is lower than a threshold. As yet another example, an outlier may be a data instance with a position in the data space that is further than a threshold distance from a centroid of a cluster. Other suitable criteria may be used to determine which data instances are outliers. The data instances that are detected as outliers at 514 may be tagged as such in database 510.

At 516, one or more artificial intelligence (AI) models are used to determine which of the outliers are noisy data instances (e.g., which of the sample values were classified as outliers due to the effects of noise present in the data instances) and which are true outliers. At 516, outliers that are noisy data instances may be tagged as such. The one or more models may each analyze the feature values of the outlier data instances to determine whether the outlier data instances are noisy data instances.

In various embodiments, any suitable one or more AI models may be used to determine whether outliers are noisy data instances, including deep learning models, neural network models, binary classification models, or other suitable AI models. In a particular embodiment, a Bayesian optimization model is utilized. This model may be trained with a hierarchical mixture of Gaussian models coupled with Gaussian outlier detection to separate noisy data instances from true outliers. For a particular image (e.g., a SEM image), the probability of using a particular mixture of Gaussian models is determined by a Bayesian probability distribution. The values of the Gaussian model and the Bayesian probabilities are automatically learnt using nonlinear optimization and dynamic programming methods using a combination of one or more metrics (e.g., minimum description length, a Bayesian Dirchlet metric, Kulbach-Liebler divergence, and/or other suitable metrics).

In some embodiments, the models used may include any one or more of a random forest model, decision tree model, and Support Vector Machine (SVM) model that is optimized, e.g., using a multi-modal asynchronous genetic algorithm (e.g., rather than the standard gradient descent methods). In a particular embodiment, a Bayesian optimization model is used together with a random forest model to detect the noisy data instances.

Any of the machine learning models utilized to detect noisy data instances may utilize supervised learning, semi-supervised learning, or unsupervised learning techniques. In supervised learning, the model may be built using a training set of data that contains both the inputs and corresponding desired outputs. Each training instance may include one or more inputs and a desired output. Training may include iterating through training instances and using an objective function to teach the model to predict the output for new inputs. In semi-supervised learning, a portion of the inputs in the training set may be missing the desired outputs. In unsupervised learning, the model may be built from a set of data which contains only inputs and no desired outputs. The unsupervised model may be used to find structure in the data (e.g., grouping or clustering of data points) by discovering patterns in the data.

In a particular embodiment, when multiple models are used, each model may perform a binary classification (e.g., noisy or not noisy) of an outlier data instance. One or more of the models may also calculate a confidence metric for the classification. The computing system may then fuse the outputs of the multiple models to make an ultimate determination on whether the outlier is classified as noisy or not noisy. The fusion may performed in any suitable manner. For example, in a conservative system, an outlier is classified as noisy only when all of the AI models classify the outlier as noisy. In other examples, if a particular model classifies the outlier as noisy with a degree of confidence above a particular threshold, the outlier may be classified as noisy even if one or more of the other models do not classify the outlier as noisy. In one embodiment, the outputs of the models may be weighted (e.g., based on their confidence metrics and/or relative ability to correctly classify noisy data instances) and then fused to determine the overall classification.

The AI models may be trained using any suitable data. In some embodiments, the AI models may be trained using data instances that have been tagged as noisy data instances or true outliers. The AI models may be trained at any suitable time as additional data becomes available and the most recently trained models may be used for inference. For example, training and inference may occur simultaneously (if training would interfere with the inference of the model, then an offline version of a particular model may be trained while the current version provides inference and once the training is completed the current version may be replaced with the newly trained version). In some embodiments, the individual AI models are trained at least in part using the classifications made by the system using a fusion of the outputs of the AI models.

At 518, noisy data instances are removed from the data collection 502 to produce a clean data collection 520 as an output. This may be achieved in any suitable manner. For example, any data instances that were tagged as noisy data instances at 516 may be omitted from the clean data collection 520 while all the other data instances of data collection 502 may be included in the clean data collection 520.

The clean data collection 520 may be provided to any suitable entity for further analysis. In one example, the clean data collection 520 is included within silicon data 420 and may be used for any of the purposes described herein with respect to silicon data 420. For example, outliers in the clean data collection 520 or information based thereon may be presented to a user for further analysis or may be used to determine a correlation between a particular design feature and a resulting manufactured feature.

The flow 500 may be repeated any suitable number of times. For example, a first data collection 502 and corresponding clean data collection 520 may represent images taken from a plurality of chips of one or more wafers at a particular processing layer and a second data collection 502 and corresponding clean data collection 520 may represent images taken from the plurality of chips of the one or more wafers at a different processing layer. Any number of data collections 502 may be generated and filtered for noise for any number of layers during the manufacturing of the wafers. The same computing system that performs flow 500 for images generated for a particular process technology may also be used for images generated using one or more other process technologies.

Figure 6:
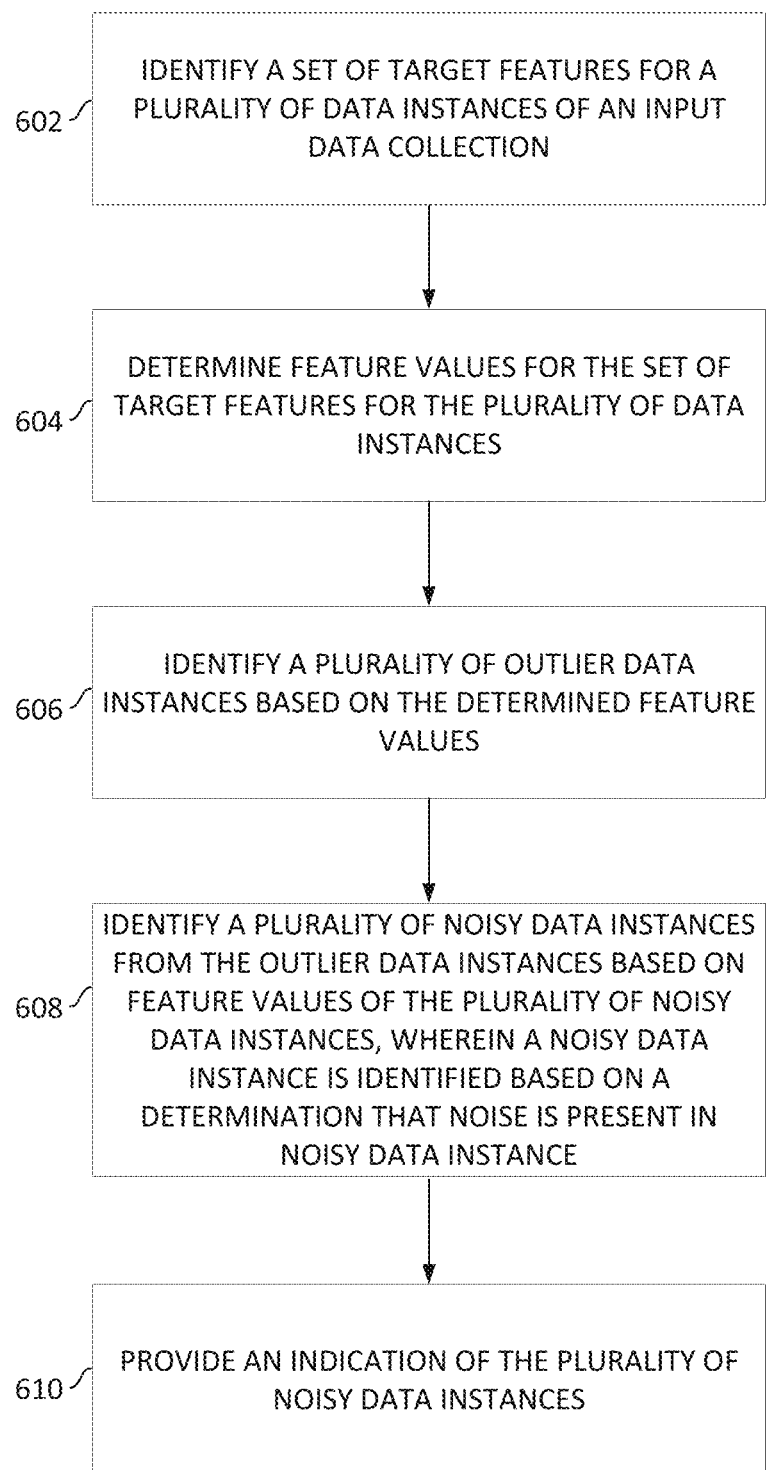
FIG. 6 illustrates a flow for identifying noisy data instances in accordance with certain embodiments.

FIG. 6 illustrates a flow for identifying noisy data instances in accordance with certain embodiments. At 602, a set of target features is identified for a plurality of data instances of an input data collection. At 604, feature values are determined for the set of target features for the plurality of data instances. At 606, a plurality of outlier data instances are identified based on the determined feature values. At 608, a plurality of noisy data instances are identified from the outlier data instances based on feature values of the plurality of noisy data instances, wherein a noisy data instance is identified based on a determination that noise is present in noisy data instance. At 610, an indication of the plurality of noisy data instances is provided.

Figure 7:
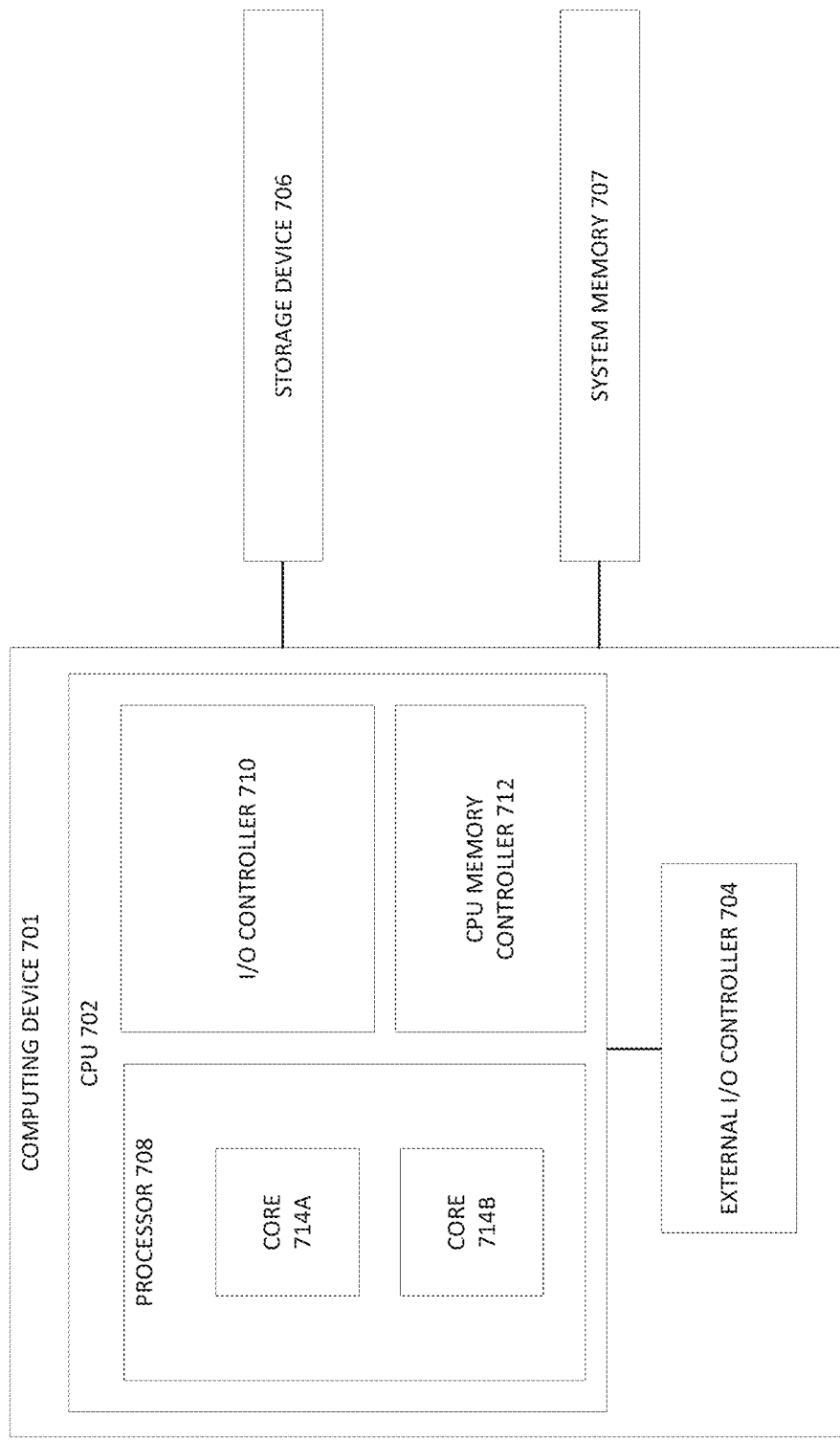
FIG. 7 illustrates a computing system in accordance with certain embodiments.

FIG. 7 illustrates a computing system 700 in accordance with certain embodiments. Any suitable components of system 700 may be used to perform any of the functions described above in connection with FIGS. 4-6. In some embodiments, extraction system 430 or a computing system utilized by a user 440 to communicate with extraction system 430 may implement one or more components of system 700. System 700 includes a computing device 701 comprising a central processing unit (CPU) 702 coupled to an external input/output (I/O) controller 704, storage device 706 (which in some embodiments may store at least a portion of silicon data 420 and/or database 510), and system memory 707. Although various components are illustrated, computing system 700 may include additional other components or multiples of the components illustrated.

During operation, data may be transferred between storage device 706 or system memory 707 and the CPU 702. In various embodiments, particular data operations (e.g., erase, program, and read operations) involving a storage device 706 or system memory 707 may be managed by an operating system or other software application executed by processor 708.

CPU 702 comprises a processor 708, such as a microprocessor, an embedded processor, a digital signal processor (DSP), a network processor, a handheld processor, an application processor, a co-processor, a system on a chip (SOC), or other device to execute code (i.e., software instructions). Processor 708, in the depicted embodiment, includes two processing elements (cores 714A and 714B in the depicted embodiment), which may include asymmetric processing elements or symmetric processing elements. However, a processor may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core 714 may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

In various embodiments, the processing elements may also include one or more arithmetic logic units (ALUs), floating point units (FPUs), caches, instruction pipelines, interrupt handling hardware, registers, or other hardware to facilitate the operations of the processing elements.

I/O controller 710 is an integrated I/O controller. I/O controller 710 may include logic for communicating data between CPU 702 and I/O devices, which may refer to any suitable devices capable of transferring data to and/or receiving data from an electronic system, such as CPU 702. For example, an I/O device may comprise an audio/video (A/V) device controller such as a graphics accelerator or audio controller; a data storage device controller, such as a flash memory device, magnetic storage disk, or optical storage disk controller; a wireless transceiver; a network processor; a network interface controller; or a controller for another input devices such as a monitor, printer, mouse, keyboard, or scanner; or other suitable device. In a particular embodiment, an I/O device may comprise a storage device 706 that may be coupled to the CPU 702 through I/O controller 710.

An I/O device may communicate with the I/O controller 710 of the CPU 702 using any suitable signaling protocol, such as peripheral component interconnect (PCI), PCI Express (PCIe), Universal Serial Bus (USB), Serial Attached SCSI (SAS), Serial ATA (SATA), Fibre Channel (FC), IEEE 802.3, IEEE 802.11, or other current or future signaling protocol. In particular embodiments, I/O controller 710 and the underlying I/O device may communicate data and commands in accordance with a logical device interface specification such as Non-Volatile Memory Express (NVMe) (e.g., as described by one or more of the specifications available at www.nvmexpress.org/specifications/) or Advanced Host Controller Interface (AHCI) (e.g., as described by one or more AHCI specifications such as Serial ATA AHCI: Specification, Rev. 1.3.1 available at http://www.intel.com/content/www/us/en/io/serial-ata/serial-ata-ahci-spec-rev1-3-1.html). In various embodiments, I/O devices coupled to the I/O controller may be located off-chip (i.e., not on the same chip as CPU 702) or may be integrated on the same chip as the CPU 702.

CPU memory controller 712 is an integrated memory controller. In various embodiments, CPU memory controller 712 may include any one or more characteristics of memory controller 110. CPU memory controller may include logic to control the flow of data going to and from one or more system memories 707. CPU memory controller 712 may include logic operable to read from a system memory 707, write to a system memory 707, or to request other operations from a system memory 707. In various embodiments, CPU memory controller 712 may receive write requests from cores 714 and/or I/O controller 710 and may provide data specified in these requests to a system memory 707 for storage therein. CPU memory controller 712 may also read data from a system memory 707 and provide the read data to I/O controller 710 or a core 714. During operation, CPU memory controller 712 may issue commands including one or more addresses of the system memory 707 in order to read data from or write data to memory (or to perform other operations). In some embodiments, CPU memory controller 712 may be implemented on the same chip as CPU 702, whereas in other embodiments, CPU memory controller 712 may be implemented on a different chip than that of CPU 702. I/O controller 710 may perform similar operations with respect to one or more storage devices 706.

The CPU 702 may also be coupled to one or more other I/O devices through external I/O controller 704. In a particular embodiment, external I/O controller 704 may couple a storage device 706 to the CPU 702. External I/O controller 704 may include logic to manage the flow of data between one or more CPUs 702 and I/O devices. In particular embodiments, external I/O controller 704 is located on a motherboard along with the CPU 702. The external I/O controller 704 may exchange information with components of CPU 702 using point-to-point or other interfaces. In various embodiments, external I/O controller 704 may include any one or more characteristics of memory controller 110.

A system memory 707 may store any suitable data, such as data used by processor 708 to provide the functionality of computer system 700. For example, data associated with programs that are executed or files accessed by cores 714 may be stored in system memory 707. Thus, a system memory 707 may include a system memory that stores data and/or sequences of instructions that are executed or otherwise used by the cores 714. In various embodiments, a system memory 707 may store persistent data (e.g., a user's files or instruction sequences) that remains stored even after power to the system memory 707 is removed. A system memory 707 may be dedicated to a particular CPU 702 or shared with other devices (e.g., one or more other processors or other devices) of computer system 700.

In various embodiments, a system memory 707 may include a memory comprising any number of memory arrays, a memory device controller (In various embodiments, the memory device controller may include any one or more characteristics of memory controller 110), and other supporting logic (not shown). A memory array may include non-volatile memory and/or volatile memory. Non-volatile memory is a storage medium that does not require power to maintain the state of data stored by the medium. Nonlimiting examples of nonvolatile memory may include any or a combination of: solid state memory (such as planar or 3D NAND flash memory or NOR flash memory), 3D crosspoint memory, memory devices that use chalcogenide phase change material (e.g., chalcogenide glass), byte addressable nonvolatile memory devices, ferroelectric memory, silicon-oxide-nitride-oxide-silicon (SONOS) memory, polymer memory (e.g., ferroelectric polymer memory), ferroelectric transistor random access memory (Fe-TRAM) ovonic memory, nanowire memory, electrically erasable programmable read-only memory (EEPROM), other various types of non-volatile random access memories (RAMS), and magnetic storage memory. In some embodiments, 3D crosspoint memory may comprise a transistor-less stackable cross point architecture in which memory cells sit at the intersection of words lines and bit lines and are individually addressable and in which bit storage is based on a change in bulk resistance. Volatile memory is a storage medium that requires power to maintain the state of data stored by the medium. Examples of volatile memory may include various types of random access memory (RAM), such as dynamic random-access memory (DRAM) or static random-access memory (SRAM). One particular type of DRAM that may be used in a memory array is synchronous dynamic random-access memory (SDRAM). In some embodiments, any portion of memory 707 that is volatile memory can comply with JEDEC standards including but not limited to Double Data Rate (DDR) standards, e.g., DDR3, 4, and 5, or Low Power DDR4 (LPDDR4) as well as emerging standards.

A storage device 706 may store any suitable data, such as data used by processor 708 to provide functionality of computer system 700. For example, data associated with programs that are executed or files accessed by cores 714A and 714B may be stored in storage device 706. Thus, in some embodiments, a storage device 706 may store data and/or sequences of instructions that are executed or otherwise used by the cores 714A and 714B. In various embodiments, a storage device 706 may store persistent data (e.g., a user's files or software application code) that remains stored even after power to the storage device 706 is removed. A storage device 706 may be dedicated to CPU 702 or shared with other devices (e.g., another CPU or other device) of computer system 700.

In various embodiments, storage device 706 includes a storage device controller and one or more memory modules. In various embodiments, the storage device controller may include any one or more characteristics of memory controller 110. In various embodiments, a memory module of storage device 706 comprises one or more NAND flash memory arrays, one or more hard disk drives, or other suitable memory storage devices. Storage device 706 may comprise any suitable type of memory and is not limited to a particular speed, technology, or form factor of memory in various embodiments. For example, a storage device 706 may be a disk drive (such as a solid-state drive), a flash drive, memory integrated with a computing device (e.g., memory integrated on a circuit board of the computing device), a memory module (e.g., a dual in-line memory module) that may be inserted in a memory socket, or other type of storage device. Moreover, computer system 700 may include multiple different types of storage devices. Storage device 706 may include any suitable interface to communicate with CPU memory controller 712 or I/O controller 710 using any suitable communication protocol such as a DDR-based protocol, PCI, PCIe, USB, SAS, SATA, FC, System Management Bus (SMBus), or other suitable protocol. A storage device 706 may also include a communication interface to communicate with CPU memory controller 712 or I/O controller 710 in accordance with any suitable logical device interface specification such as NVMe, AHCI, or other suitable specification. In particular embodiments, storage device 706 may comprise multiple communication interfaces that each communicate using a separate protocol with CPU memory controller 712 and/or I/O controller 710.

In some embodiments, all, or some of the elements of system 700 are resident on (or coupled to) the same circuit board (e.g., a motherboard). In various embodiments, any suitable partitioning between the elements may exist. For example, the elements depicted in CPU 702 may be located on a single die (i.e., on-chip) or package or any of the elements of CPU 702 may be located off-chip or off-package. Similarly, the elements depicted in storage device 706 may be located on a single chip or on multiple chips. In various embodiments, a storage device 706 and a computing device (e.g., CPU 702) may be located on the same circuit board or on the same device and in other embodiments the storage device 706 and the computing device may be located on different circuit boards or devices.

The components of system 700 may be coupled together in any suitable manner. For example, a bus may couple any of the components together. A bus may include any known interconnect, such as a multi-drop bus, a mesh interconnect, a ring interconnect, a point-to-point interconnect, a serial interconnect, a parallel bus, a coherent (e.g. cache coherent) bus, a layered protocol architecture, a differential bus, and a Gunning transceiver logic (GTL) bus. In various embodiments, an integrated I/O subsystem includes point-to-point multiplexing logic between various components of system 700, such as cores 714, one or more CPU memory controllers 712, I/O controller 710, integrated I/O devices, direct memory access (DMA) logic (not shown), etc. In various embodiments, components of computer system 700 may be coupled together through one or more networks comprising any number of intervening network nodes, such as routers, switches, or other computing devices. For example, a computing device (e.g., CPU 702) and the storage device 706 may be communicably coupled through a network.

Although not depicted, system 700 may use a battery and/or power supply outlet connector and associated system to receive power, a display to output data provided by CPU 702, or a network interface allowing the CPU 702 to communicate over a network. In various embodiments, the battery, power supply outlet connector, display, and/or network interface may be communicatively coupled to CPU 702. Other sources of power can be used such as renewable energy (e.g., solar power or motion based power).

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the described hardware.

In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

In various embodiments, a medium storing a representation of the design may be provided to a manufacturing system (e.g., a semiconductor manufacturing system capable of manufacturing an integrated circuit and/or related components). The design representation may instruct the system to manufacture a device capable of performing any combination of the functions described above. For example, the design representation may instruct the system regarding which components to manufacture, how the components should be coupled together, where the components should be placed on the device, and/or regarding other suitable specifications regarding the device to be manufactured.

A module as used herein refers to circuitry and any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Logic may be used to implement any of the flows described or functionality of the various components such as CPU 702, external I/O controller 704, processor 708, cores 714A and 714B, I/O controller 710, CPU memory controller 712, storage device 706, system memory 707, subcomponents thereof, or other entity or component described herein. "Logic" may refer to hardware, firmware, software and/or combinations of each to perform one or more functions. In various embodiments, logic may include a microprocessor or other processing element operable to execute software instructions, discrete logic such as an application specific integrated circuit (ASIC), a programmed logic device such as a field programmable gate array (FPGA), a storage device containing instructions, combinations of logic devices (e.g., as would be found on a printed circuit board), or other suitable hardware and/or software. Logic may include one or more gates or other circuit components. In some embodiments, logic may also be fully embodied as software. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in storage devices.

Use of the phrase 'to' or 'configured to,' in one embodiment, refers to arranging, putting together, manufacturing, offering to sell, importing, and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash storage devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

The following examples pertain to embodiments in accordance with this Specification. Example 1 is at least one machine readable storage medium having instructions stored thereon, the instructions when executed by a machine to cause the machine to identify a set of target features for a plurality of data instances of an input data collection; determine feature values for the set of target features for the plurality of data instances; identify a plurality of outlier data instances based on the determined feature values; identify a plurality of noisy data instances from the outlier data instances based on feature values of the plurality of noisy data instances, wherein a noisy data instance is identified based on a determination that noise is present in noisy data instance; and provide an indication of the plurality of noisy data instances.

Example 2 may include the subject matter of example 1, wherein the instructions when executed are to cause the machine to determine a class of the input data collection; and select the set of target features from a plurality of target features based on the class of the input data collection.

Example 3 may include the subject matter of example 2, wherein the plurality of data instances are images of a processing layer of at least one semiconductor chip of at least one wafer of a process technology and wherein the class of the data instance corresponds to the processing layer and the process technology.

Example 4 may include the subject matter of any of examples 2-3, the instructions when executed to cause the machine to determine the class of the input data collection based on feature values determined for the plurality of target features for a subset of the plurality of data instances of the input data collection.

Example 5 may include the subject matter of any of examples 1-4, wherein identifying the plurality of outlier data instances based on the determined feature values comprises clustering the plurality data instances of the input data collection based on the determined feature values.

Example 6 may include the subject matter of any of examples 1-5, wherein the instructions when executed are to cause the machine to utilize a first model to generate a first prediction indicative of whether a first one of the outlier data instances should be classified as a noisy data instance; utilize a second model to generate a second prediction indicative of whether the first one of the outlier data instances should be classified as a noisy data instance; and determine whether the first one of the outlier data instances is a noisy data instance based on the first prediction and the second prediction.

Example 7 may include the subject matter of example 6, wherein the first model is a random forest model and the second model is a Bayesian optimization model.

Example 8 may include the subject matter of example 7, wherein the Bayesian optimization model is trained with a hierarchical mixture of Gaussian models coupled with Gaussian outlier detection.

Example 9 may include the subject matter of example 7, wherein the random forest model is optimized using a multi-modal asynchronous genetic algorithm.

Example 10 may include the subject matter of any of examples 1-9, wherein the set of target features comprises one or more of alignment distance, alignment quality, a Laplacian of Gaussian-based blob measure, image entropy, merged contours, broken contours, unexpected contours, contour width distribution, contour height distribution, contour area distribution, local or global image intensity histogram, local or global image contrast variation, line-edge roughness, and line-width roughness.

Example 11 is a method comprising identifying a set of target features for a plurality of data instances of an input data collection; determining feature values for the set of target features for the plurality of data instances; identifying a plurality of outlier data instances based on the determined feature values; identifying a plurality of noisy data instances from the outlier data instances based on feature values of the plurality of noisy data instances, wherein a noisy data instance is identified based on a determination that noise is present in noisy data instance; and providing an indication of the plurality of noisy data instances.

Example 12 may include the subject matter of example 11, wherein the method further comprises determining a class of the input data collection; and selecting the set of target features from a plurality of target features based on the class of the input data collection.

Example 13 may include the subject matter of example 2, wherein the plurality of data instances are images of a processing layer of at least one semiconductor chip of at least one wafer of a process technology and wherein the class of the data instance corresponds to the processing layer and the process technology.

Example 14 may include the subject matter of any of examples 12-13, the instructions when executed to cause the machine to determine the class of the input data collection based on feature values determined for the plurality of target features for a subset of the plurality of data instances of the input data collection.

Example 15 may include the subject matter of any of examples 11-14, wherein identifying the plurality of outlier data instances based on the determined feature values comprises clustering the plurality data instances of the input data collection based on the determined feature values.

Example 16 may include the subject matter of any of examples 11-15, the method further comprising utilizing a first model to generate a first prediction indicative of whether a first one of the outlier data instances should be classified as a noisy data instance; utilizing a second model to generate a second prediction indicative of whether the first one of the outlier data instances should be classified as a noisy data instance; and determining whether the first one of the outlier data instances is a noisy data instance based on the first prediction and the second prediction.

Example 17 may include the subject matter of example 16, wherein the first model is a random forest model and the second model is a Bayesian optimization model.

Example 18 may include the subject matter of example 17, wherein the Bayesian optimization model is trained with a hierarchical mixture of Gaussian models coupled with Gaussian outlier detection.

Example 19 may include the subject matter of example 17, wherein the random forest model is optimized using a multi-modal asynchronous genetic algorithm.

Example 20 may include the subject matter of any of examples 11-19, wherein the set of target features comprises one or more of alignment distance, alignment quality, a Laplacian of Gaussian-based blob measure, image entropy, merged contours, broken contours, unexpected contours, contour width distribution, contour height distribution, contour area distribution, local or global image intensity histogram, local or global image contrast variation, line-edge roughness, and line-width roughness.

Example 21 is an apparatus comprising a memory to store an input data collection comprising a plurality of data instances; and a processor coupled to the memory, the processor to identify a set of target features for the plurality of data instances of the input data collection; determine feature values for the set of target features for the plurality of data instances; identify a plurality of outlier data instances based on the determined feature values; identify a plurality of noisy data instances from the outlier data instances based on feature values of the plurality of noisy data instances, wherein a noisy data instance is identified based on a determination that noise is present in noisy data instance; and provide an indication of the plurality of noisy data instances.

Example 22 may include the subject matter of example 21, wherein the processor is to determine a class of the input data collection; and select the set of target features from a plurality of target features based on the class of the input data collection.

Example 23 may include the subject matter of example 22, wherein the plurality of data instances are images of a processing layer of at least one semiconductor chip of at least one wafer of a process technology and wherein the class of the data instance corresponds to the processing layer and the process technology.

Example 24 may include the subject matter of any of examples 22-23, the processor to determine the class of the input data collection based on feature values determined for the plurality of target features for a subset of the plurality of data instances of the input data collection.

Example 25 may include the subject matter of any of examples 21-24, wherein identifying the plurality of outlier data instances based on the determined feature values comprises clustering the plurality data instances of the input data collection based on the determined feature values.

Example 26 may include the subject matter of any of examples 21-25, wherein the processor is to utilize a first model to generate a first prediction indicative of whether a first one of the outlier data instances should be classified as a noisy data instance; utilize a second model to generate a second prediction indicative of whether the first one of the outlier data instances should be classified as a noisy data instance; and determine whether the first one of the outlier data instances is a noisy data instance based on the first prediction and the second prediction.

Example 27 may include the subject matter of example 26, wherein the first model is a random forest model and the second model is a Bayesian optimization model.

Example 28 may include the subject matter of example 27, wherein the Bayesian optimization model is trained with a hierarchical mixture of Gaussian models coupled with Gaussian outlier detection.

Example 29 may include the subject matter of example 27, wherein the random forest model is optimized using a multi-modal asynchronous genetic algorithm.

Example 30 may include the subject matter of any of examples 21-29, wherein the set of target features comprises one or more of alignment distance, alignment quality, a Laplacian of Gaussian-based blob measure, image entropy, merged contours, broken contours, unexpected contours, contour width distribution, contour height distribution, contour area distribution, local or global image intensity histogram, local or global image contrast variation, line-edge roughness, and line-width roughness.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. At least one non-transitory machine readable storage medium having instructions stored thereon, the instructions when executed by a machine to cause the machine to:
   identify a set of target features for a plurality of data instances of an input data collection, wherein the plurality of data instances comprise images captured from one or more semiconductor dies or snapshots of a layout database file providing a representation of a semiconductor die, wherein the set of target features for the plurality of data instances are selected based on a technology node that refers to a specific semiconductor manufacturing process applicable to the plurality of data instances;
   determine feature values for the set of target features for the plurality of data instances and store the determined feature values in a database;
   identify a plurality of outlier data instances based on the determined feature values stored in the database and generate tags within the database identifying the outlier data instances as outliers;
   identify, utilizing at least one artificial intelligence model, a plurality of noisy data instances from the outlier data instances based on feature values of the plurality of noisy data instances, wherein a noisy data instance is identified based on a determination that noise is present in the noisy data instance; and
   provide an indication of the plurality of noisy data instances.

2. The at least one medium of claim 1, the instructions when executed to cause the machine to:
   determine a class of the input data collection; and
   select the set of target features from a plurality of target features based on the class of the input data collection.

3. The at least one medium of claim 2, wherein the plurality of data instances are images of a processing layer of at least one semiconductor chip of at least one wafer of a process technology and wherein the class of the data instance corresponds to the processing layer and the process technology.

4. The at least one medium of claim 2, the instructions when executed to cause the machine to determine the class of the input data collection based on feature values determined for the plurality of target features for a subset of the plurality of data instances of the input data collection.

5. The at least one medium of claim 1, wherein identifying the plurality of outlier data instances based on the determined feature values comprises clustering the plurality data instances of the input data collection based on the determined feature values.

6. The at least one medium of claim 1, the instructions when executed to cause the machine to:
   utilize a first model to generate a first prediction indicative of whether a first one of the outlier data instances should be classified as a noisy data instance;
   utilize a second model to generate a second prediction indicative of whether the first one of the outlier data instances should be classified as a noisy data instance; and
   determine whether the first one of the outlier data instances is a noisy data instance based on the first prediction and the second prediction.

7. The at least one medium of claim 6, wherein the first model is a random forest model and the second model is a Bayesian optimization model.

8. The at least one medium of claim 7, wherein the Bayesian optimization model is trained with a hierarchical mixture of Gaussian models coupled with Gaussian outlier detection.

9. The at least one medium of claim 7, wherein the random forest model is optimized using a multi-modal asynchronous genetic algorithm.

10. The at least one medium of claim 1, wherein the set of target features comprises one or more of alignment distance, alignment quality, a Laplacian of Gaussian-based blob measure, image entropy, merged contours, broken contours, unexpected contours, contour width distribution, contour height distribution, contour area distribution, local or global image intensity histogram, local or global image contrast variation, line-edge roughness, and line-width roughness.

11. A method comprising:
identifying a set of target features for a plurality of data instances of an input data collection, wherein the plurality of data instances comprise images captured from one or more semiconductor dies or snapshots of a layout database file providing a representation of a semiconductor die, wherein the set of target features for the plurality of data instances are selected based on a technology node that refers to a specific semiconductor manufacturing process applicable to the plurality of data instances;
determining feature values for the set of target features for the plurality of data instances and storing the determined feature values in a database;
identifying a plurality of outlier data instances based on the determined feature values stored in the database and generating tags within the database identifying the outlier data instances as outliers;
identifying, utilizing at least one artificial intelligence model, a plurality of noisy data instances from the outlier data instances based on feature values of the plurality of noisy data instances, wherein a noisy data instance is identified based on a determination that noise is present in the noisy data instance; and
providing an indication of the plurality of noisy data instances.

12. The method of claim 11, further comprising:
determining a class of the input data collection; and
selecting the set of target features from a plurality of target features based on the class of the input data collection.

13. The method of claim 12, wherein the plurality of data instances are images of a processing layer of at least one semiconductor chip of at least one wafer of a process technology and wherein the class of the data instance corresponds to the processing layer and the process technology.

14. The method of claim 12, further comprising determining the class of the input data collection based on feature values determined for the plurality of target features for a subset of the plurality of data instances of the input data collection.

15. The method of claim 11, wherein identifying the plurality of outlier data instances based on the determined feature values comprises clustering the plurality data instances of the input data collection based on the determined feature values.

16. An apparatus comprising:
a memory to store an input data collection comprising a plurality of data instances; and
a processor coupled to the memory, the processor comprising circuitry, the processor to:
identify a set of target features for the plurality of data instances of the input data collection, wherein the plurality of data instances comprise images captured from one or more semiconductor dies or snapshots of a layout database file providing a representation of a semiconductor die, wherein the set of target features for the plurality of data instances are selected based on a technology node that refers to a specific semiconductor manufacturing process applicable to the plurality of data instances;
determine feature values for the set of target features for the plurality of data instances and store the determined feature values in the memory;
identify a plurality of outlier data instances based on the determined feature values stored in the memory and generate tags within the memory identifying the outlier data instances as outliers;
identify, utilizing at least one artificial intelligence model, a plurality of noisy data instances from the outlier data instances based on feature values of the plurality of noisy data instances, wherein a noisy data instance is identified based on a determination that noise is present in the noisy data instance; and
provide an indication of the plurality of noisy data instances.

17. The apparatus of claim 16, the processor to:
determine a class of the input data collection; and
select the set of target features from a plurality of target features based on the class of the input data collection.

18. The apparatus of claim 17, wherein the plurality of data instances are images of a processing layer of at least one semiconductor chip of at least one wafer of a process technology and wherein the class of the data instance corresponds to the processing layer and the process technology.

19. The apparatus of claim 16, further comprising an imaging tool to capture the data instances of the input data collection.

20. The apparatus of claim 16, further comprising one or more of a battery communicatively coupled to the processor, a display communicatively coupled to the processor, or a network interface communicatively coupled to the processor.

* * * * *